(12) United States Patent
Belle et al.

(10) Patent No.: US 11,383,709 B2
(45) Date of Patent: Jul. 12, 2022

(54) REGULATION OF THE SPEED OF A VEHICLE WHEN OVERTAKING ON A BEND

(71) Applicant: PSA AUTOMOBILES SA, Poissy (FR)

(72) Inventors: Claire Belle, Seloncourt (FR); Eric Favreau, Masevaux (FR)

(73) Assignee: PSA AUTOMOBILES SA, Poissy (FR)

( * ) Notice: Subject to any disclaimer, the term of this patent is extended or adjusted under 35 U.S.C. 154(b) by 0 days.

(21) Appl. No.: 17/425,637

(22) PCT Filed: Feb. 5, 2020

(86) PCT No.: PCT/FR2020/050199
§ 371 (c)(1),
(2) Date: Jul. 23, 2021

(87) PCT Pub. No.: WO2020/174141
PCT Pub. Date: Sep. 3, 2020

(65) Prior Publication Data
US 2022/0041161 A1 Feb. 10, 2022

(30) Foreign Application Priority Data
Feb. 28, 2019 (FR) ...................................... 1902090

(51) Int. Cl.
*B60W 30/14* (2006.01)
*B60W 30/18* (2012.01)

(52) U.S. Cl.
CPC .... *B60W 30/146* (2013.01); *B60W 30/18145* (2013.01); *B60W 30/18163* (2013.01);
(Continued)

(58) Field of Classification Search
CPC ......... B60W 30/146; B60W 30/18145; B60W 30/18163; B60W 2552/10;
(Continued)

(56) References Cited

U.S. PATENT DOCUMENTS

2005/0240335 A1 10/2005 Schroder
2007/0208485 A1* 9/2007 Yamamura ......... G01C 21/3697
701/93
(Continued)

FOREIGN PATENT DOCUMENTS

EP 1034963 A1 9/2000
WO 2018047291 A1 3/2018

OTHER PUBLICATIONS

International Search Report for PCT/FR2020/050199 dated Apr. 24, 2020.
Written Opinion for PCT/FR2020/050199 dated Apr. 24, 2020.

*Primary Examiner* — Anshul Sood
(74) *Attorney, Agent, or Firm* — Sandberg Phoenix & von Gontard PC

(57) ABSTRACT

A method is intended to regulate the speed of an at least partially automated vehicle traveling on a first traffic lane adjacent to a second traffic lane. This method comprises a step (10-80) in which, if a radius of curvature of a future portion representative of a bend is detected, a phase of deceleration to a first deceleration speed adapted to the radius of curvature is imposed on the first vehicle unless it is in the course of overtaking a second vehicle traveling in the second traffic lane, since in that case a current speed of the second vehicle is determined and then, if the first deceleration speed is less than this current speed, the first deceleration speed is replaced with a second deceleration speed greater than this current speed.

9 Claims, 3 Drawing Sheets

(52) U.S. Cl.
CPC ..... *B60W 2540/22* (2013.01); *B60W 2552/10* (2020.02); *B60W 2552/30* (2020.02); *B60W 2554/4041* (2020.02); *B60W 2554/4042* (2020.02); *B60W 2554/4043* (2020.02); *B60W 2720/10* (2013.01); *B60W 2720/125* (2013.01)

(58) Field of Classification Search
CPC ..... B60W 2552/30; B60W 2554/4041; B60W 2554/4042; B60W 2554/4043; B60W 2720/10; B60W 2720/125
See application file for complete search history.

(56) References Cited

U.S. PATENT DOCUMENTS

| | | | |
|---|---|---|---|
| 2016/0362106 A1* | 12/2016 | Maeda | B60W 30/18145 |
| 2018/0345953 A1* | 12/2018 | Mizoguchi | B60W 30/18145 |
| 2018/0362001 A1 | 12/2018 | Inou et al. | |
| 2019/0232970 A1* | 8/2019 | Watanabe | B60W 40/107 |
| 2019/0359215 A1* | 11/2019 | Shimakage | B60R 21/00 |
| 2019/0389461 A1* | 12/2019 | Ohmura | B60W 30/0953 |
| 2020/0180617 A1* | 6/2020 | Tezuka | B60W 30/182 |
| 2020/0207372 A1* | 7/2020 | Akamatsu | B60W 60/0018 |
| 2021/0237769 A1* | 8/2021 | Ostafew | B60W 60/0015 |

\* cited by examiner

REGULATION OF THE SPEED OF A VEHICLE WHEN OVERTAKING ON A BEND

CROSS-REFERENCE TO RELATED APPLICATIONS

This application is the US National Stage under 35 USC § 371 of International Application No. PCT/FR2020/050199, filed 5 Feb. 2020 which claims priority to French Application No. 1902090 filed 28 Feb. 2019, both of which are incorporated herein by reference.

TECHNICAL FIELD

The invention relates to at least partially self-driving (or autonomous) vehicles, and optionally of the automobile type, and more precisely to the regulation of the speed of such vehicles.

In what follows, a land vehicle is considered to be at least partially self-driving (or autonomous) when it can be driven on a road in a (partially or totally) automated manner (without intervention of the driver) during a self-driving phase, or manually (and therefore with intervention by the driver on the steering wheel (or handlebar) and/or the pedals (or levers) during a manual driving phase. For example, the automated (or autonomous) driving of a vehicle (with at least partially automated driving) may consist in partially or totally steering this vehicle or in providing any type of assistance to a natural person driving this vehicle. This therefore covers any automated (or autonomous) driving, from level 1 to level 5 on the scale of the OICA (International Organization of Motor Vehicle Manufacturers).

Moreover, here a "land vehicle" refers to any type of vehicle that can travel on a road, and in particular a motor vehicle, a utility vehicle, a moped, a motorcycle, a minibus, a bus, a storage robot in a warehouse or a road machine.

Certain at least partially self-driving (or autonomous) vehicles comprise a regulation device responsible for controlling their speed as a function of a speed setpoint, optionally chosen by their driver. Some of these regulation devices comprise an option making it possible to adapt the speed of their vehicle as a function of the radius of curvature of the future portion of the road which the vehicle is about to take in the traffic lane along which it is traveling. Such an option is often referred to as CSA ("Curve Speed Adaptation").

When this CSA option is present, each time a radius of curvature of the adopted future portion of the lane in which the vehicle is traveling is representative of a bend, a deceleration phase is imposed on the vehicle reducing the speed down to a chosen deceleration speed (or speed for passing in a bend), followed by an acceleration phase until a speed is obtained which is equal to the speed setpoint. The acceleration in the acceleration phase depends on the radius of curvature of the section of road in front of the vehicle. It can therefore be limited or not. To simplify, if an upcoming bend is detected, the CSA option makes it possible to temporarily reduce the speed of the vehicle in order to facilitate its passage through this bend and thus to improve passenger comfort.

A drawback of this type of option lies in the management of overtaking (passing) in the case of autonomous driving in curves (in particular on the motorway or expressway). For example, such management proves to be problematic when a first vehicle which is equipped with this type of option is traveling in a first traffic lane which is adjacent to a second traffic lane in which a second vehicle is traveling, and this first vehicle is overtaking this second vehicle just before entering this bend. In fact, in the latter situation, the chosen speed of deceleration (or overtaking on a bend) may be less than the current speed of the second vehicle, and therefore the first vehicle finds itself in the middle of a bend with a speed lower than that of the second vehicle; this may cause a slowdown in the flow of traffic which may appear incomprehensible to drivers of vehicles following the slowed down first vehicle, or may even prove dangerous when one of the drivers of vehicles following the first vehicle does not notice that the first vehicle has slowed down or decides to overtake the first vehicle using the second traffic lane following the second vehicle (which is prohibited by traffic regulations).

The object of the invention is, in particular, to improve this situation.

SUMMARY

For this purpose, a method is disclosed which is on the one hand intended to regulate the speed of an at least partially self-driving vehicle, knowing the radius of curvature of a future portion of the lane the self-driving vehicle is about to take in a first traffic lane along which it is traveling and adjacent to a second traffic lane, and, on the other hand, comprising a step in which, if a radius of curvature of the future portion representative of a bend is detected, a deceleration phase down to a first speed of deceleration (or of overtaking on a bend) adapted to the radius of curvature is imposed on the first vehicle.

This method is characterized by the fact that in its step, when the first vehicle is overtaking a second vehicle traveling in the second traffic lane:
- a current speed of the second vehicle is determined, then
- if the first deceleration speed is less than this determined current speed, the first deceleration speed is replaced by a second speed of deceleration (or of overtaking on a bend) which is greater than this determined current speed.

The speed of the first vehicle in the bend remaining greater than that of the second vehicle that it is overtaking (apart from exceptional situations), avoids causing a slowdown in the flow of traffic and tempting a driver of a vehicle following the first vehicle to overtake the first vehicle using the second traffic lane following the second vehicle.

The method according may comprise other features that may be included separately or in combination, and in particular:
- in its step, it is possible to determine a maximum deceleration speed as a function of a first maximum transverse acceleration that the first vehicle can undergo on the bend taking into account the curve's radius of curvature, and it is possible to determine a second deceleration speed less than or equal to the determined maximum deceleration speed;
- in its step, when the determined maximum deceleration speed is less than or equal to the current speed of the second vehicle, it is possible to impose a second deceleration speed less than or equal to this determined maximum deceleration speed and therefore less than or equal to this current speed;
- in its step, the maximum deceleration speed can be determined as a function, moreover, of a second maximum transverse acceleration taking into consideration a minimum level of passenger comfort of the first vehicle;

in its step, the maximum deceleration speed can be determined as a function of at least one parameter chosen from the following: a speed setpoint for the speed regulation of the first vehicle, a speed limit imposed on the first traffic lane, a current speed and/or acceleration of the second vehicle, the number of vehicles preceding the second vehicle in the second traffic lane, the presence of another vehicle following the first vehicle in the first traffic lane, and the presence of another vehicle followed by the first vehicle or by the second vehicle;

in its step, the second deceleration speed can be determined as a function of at least one parameter chosen from the following: a speed setpoint for the speed regulation of the first vehicle, a speed limit imposed on the first traffic lane, a current speed and/or acceleration of the second vehicle, a number of vehicles preceding the second vehicle in the second traffic lane, the presence of another vehicle following the first vehicle in the first traffic lane, and the presence of another vehicle followed by the first vehicle or by the second vehicle;

in its step, it is not possible to proceed with the replacement of the first deceleration speed by the second deceleration speed when the first and second traffic lanes have different destinations.

A computer program product is also proposed, the computer program comprising a set of instructions which, when it is executed by a processing means, is suitable for implementing a speed regulation method of the type of that presented above to regulate the speed of an at least partially self-driving vehicle and knowing the radius of curvature of a future portion of the road that the vehicle is preparing to take in a first traffic lane along which it is traveling and adjacent to a second traffic lane.

A speed regulation device is proposed which, on one hand, is intended to equip an at least partially self-driving vehicle and knowing the radius of curvature of a future portion that it is about to take in a first traffic lane along which it is traveling and adjacent to a second traffic lane, and, on the other hand, comprises at least one processor and at least one memory arranged to perform, if a radius of curvature of the future portion representative of a bend is detected, the operations comprised of imposing a deceleration phase to a first deceleration speed adapted to this radius of curvature on the first vehicle.

This speed regulation device is characterized in that, when the first vehicle is passing a second vehicle traveling in the second traffic lane, its processor and its memory are arranged to perform operations comprising determining a current speed of the second vehicle, then, if the first deceleration speed is less than this determined current speed, replacing the first deceleration speed with a second deceleration speed which is greater than the determined current speed.

A vehicle, possibly an automobile, is proposed which is at least partially self-driving, knowing the radius of curvature of a future portion that it is preparing to take in a first traffic lane along which it is traveling and adjacent to a second traffic lane, and comprising a speed regulation device of the type presented above.

BRIEF DESCRIPTION OF THE FIGURES

Other features and advantages of the method and speed regulation device will become apparent on examination of the detailed description that follows and from the drawings, in which.

DETAILED DESCRIPTION

A speed regulation method and an associated speed regulation device DR are proposed which are intended to allow the speed regulation of a first at least partially self-driving (autonomous) vehicle V1, at least in the presence of a bend. In the following, and by way of a non-limiting example, the first at least partially self-driving (or autonomous) vehicle V1 is of the automobile type. This is for example a car, as illustrated non-limitingly in FIG. 1. However, the method is not limited to this type of vehicle. Indeed, the method and speed regulation device can be used with any type of at least partially self-driving land vehicle that can travel in land traffic lanes. Thus, for example, the vehicle could also be a utility vehicle, a moped, a motorcycle, a minibus, a bus, a storage robot in a warehouse, or a road machine. In general, the method and speed regulation device can be used with any land vehicle capable of overtaking another land vehicle.

Figure 1:
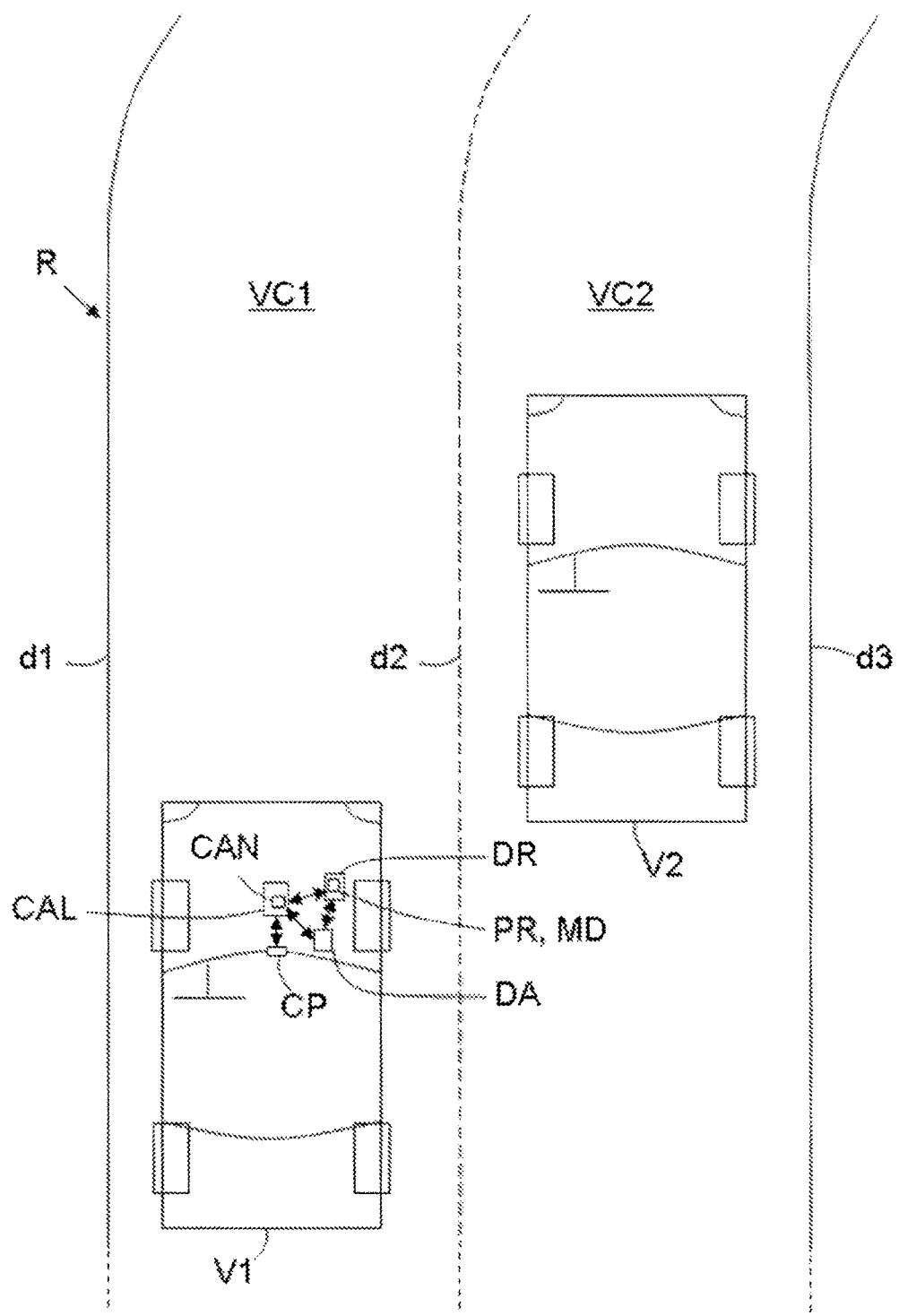
FIG. 1 schematically and functionally illustrates a vehicle located on one of the two traffic lanes of a road and equipped with a speed regulation device, FIG. 2 schematically illustrates an example of an algorithm implementing a speed regulation method.

FIG. 1 schematically and functionally shows a road R comprising a first traffic lane VC1 and a second traffic lane VC2 along which first V1 and second V2 vehicles, respectively, travel. The first traffic lane VC1 is delimited (or defined) by two delimitations d1 and d2, and the second traffic lane VC2 is delimited (or defined) by two delimitations d2 and d3. Furthermore, in this FIG. 1, the first vehicle V1 is overtaking (or passing) the second vehicle V2.

The first vehicle V1 comprises at least one speed regulation device DR according. In the example illustrated in a non-limiting manner in FIG. 1, the first vehicle V1 also optionally comprises a sensor CP, analysis circuits CAN and a driving assistance device DA which will be explained below.

It will be noted that in order for the method to be able to be implemented, the first vehicle V1 must know at all times the radius of curvature rc of at least the future portion of the first traffic lane VC1 that it is about to enter while overtaking (passing) vehicle V2. This knowledge can result from an analysis of the environment, or from road information defining each portion of the road R taken (and in particular its radius of curvature rc (or its inverse, namely the curvature)), or from an analysis of the coordinates (for example GPS) of the road R.

The analysis of the environment can, for example, result from the (permanent) presence in the first vehicle V1 of at least one sensor CP and of analysis circuits CAN, as illustrated in a non-limiting manner in FIG. 1.

This sensor CP can, for example, comprise at least one digital camera installed in a front part of the vehicle (for example on the windshield or on the interior rearview mirror), and which is responsible for acquiring digital images of the environment which is at least located in front of the first vehicle V1 (as well as possibly on part of the two lateral sides of the vehicle V1). It should be noted that the number of sensors CP here is equal to one (1), but it can take any value greater than or equal to one (1) (at least one sensor on the front), as long as this makes it possible to acquire data in the environment which is at least in front of the first vehicle V1. Thus, the first vehicle V1 could also comprise at least one ultrasonic sensor, or at least one radar or lidar, or at least one other camera installed in a rear part and/or cameras installed on its two lateral sides. The analysis circuits CAN are arranged so as to analyze at least the digital images acquired by the sensor CP in the environment situated at least in front of the first vehicle V1, in order to determine data which are representative at least of the first traffic lane VC1 along which the first vehicle V1 travels temporarily. For example, these environmental data can define at least the radius of curvature rc (or the curvature) of the portions of the two delimitations d1 and d2 of the first traffic lane VC1 that the first vehicle V1 is about to take. It will be noted that these environmental data can also define the heading of the first vehicle V1, and/or the estimate of the derivative of the radius of curvature rc, and/or the width of a delimitation, and/or the distance separating two delimitations (here d1 and d2), and/or the speed of a vehicle detected in the vicinity, and/or the acceleration of a vehicle detected in the vicinity, for example.

In the example illustrated in a non-limiting manner in FIG. 1, the analysis circuits CAN form part of a computer CAL on board the first vehicle V1. However, this is not mandatory. Indeed, the analysis circuits CAN could comprise their own computer or be part of the sensor CP. Consequently, the analysis circuits CAN can be produced in the form of a combination of electrical or electronic circuits or components (or hardware) and software (or computer) modules.

As a variant, only at least one environmental mapping and an on-board radar can be used to determine the speed of the overtaken second vehicle V2. In this case, the road information (defining each portion of the road R taken) can come from a database defining a very precise road map on board the first vehicle V1 or else accessible via waves by the first vehicle V1. The geographical position of the future portion which the first vehicle V1 is about to take along the first traffic lane VC1 is precisely determined, for example by means of an on-board navigation assistance device (possibly temporarily) in the first vehicle V1, then the radius of curvature rc (or the curvature) which is associated with this future position is determined in the database.

In the absence of a sensor CP but in the presence of coordinates (for example GPS) of the road R, the analysis circuits CAN are arranged so as to analyze these coordinates in order to determine the environmental data which define at least the radius of curvature (or the curvature) of the portions of the two delimitations d1 and d2 of the first traffic lane VC1 that the first vehicle V1 is preparing to take. These coordinates of the road R can, for example, be provided by an on-board navigation assistance device (possibly temporarily) in the first vehicle V1.

The driving assistance device DA is for example intended to control the driving of the first vehicle V1 (at least partially) in an automated (or autonomous) manner, as a function of the environmental data. This control is done using commands which are determined for components of the first vehicle V1 which are involved in the movement of the vehicle V1, such as for example the powertrain, the braking system, and the gear changing means (for example an automatic gearbox).

The (driving) assistance device DA here comprises its own computer, but this is not mandatory. Indeed, the (driving) assistance device DA could form part of a computer providing at least one other function within the first vehicle V1. In addition, the analysis circuits CAN could be part of the driving assistance device DA.

As mentioned above, proposed is a speed regulation method intended to allow the automated regulation of the speed of the first vehicle V1.

This method (of speed regulation) can be at least partially implemented by the (speed) regulation device DR, which for this purpose comprises at least one processor PR and at least one memory MD. In the example illustrated non-limitingly in FIG. 1, the (speed) regulation device DR comprises its own computer. However, this is not mandatory. Indeed, the regulation device DR could form part of a computer providing at least one other function within the first vehicle V1. Thus, it could, for example, be part of the driving assistance device DA. Therefore, the regulation device DR can be produced as a combination of electrical or electronic circuits or components and software modules. The memory MD is RAM memory in order to store instructions for implementation by the processor PR of the regulation method. The processor PR is, for example, a digital signal processor (or DSP).

Figure 2:
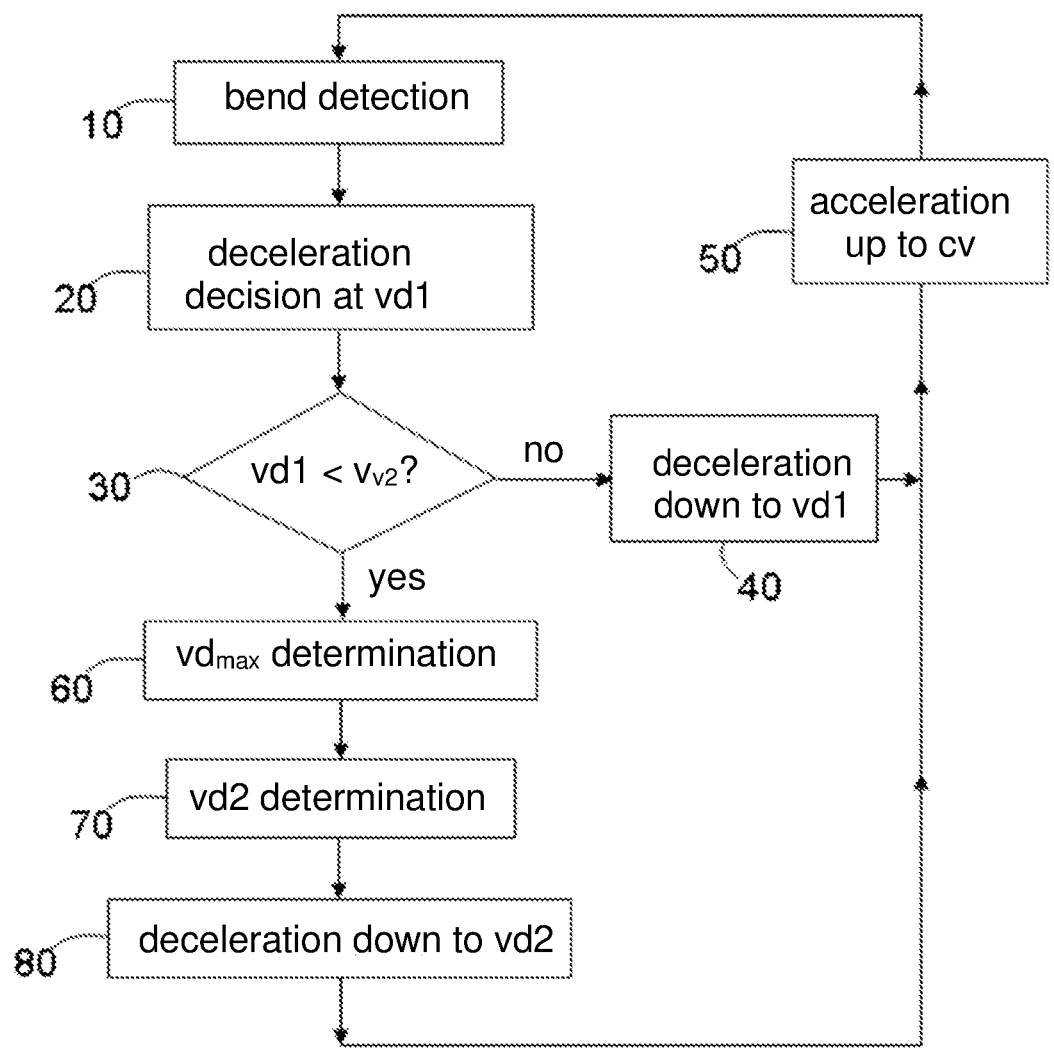

As illustrated in FIG. 2, the (speed regulation) method according to the invention comprises a step 10-80 which can be subdivided into sub-steps 10 to 80 and which starts when the speed regulation function (of the regulation device DR) has been activated (by the driver of the first vehicle V1 or the any driving assistance device DA).

In a sub-step 10, the processor PR and the memory MD detect that the radius of curvature rc of the future portion that the first vehicle V1 is about to take along the first traffic lane VC1 and which has just been communicated by the analysis circuits CAN is representative of a bend in the road R.

It is important to note that in above and hereinafter, "bend" is understood to mean a road portion whose radius of curvature rc requires a reduction in speed in order to improve driver and passenger comfort and also to allow the first vehicle V1 to better travel through the bend.

The bend detection can, for example, result from a comparison of this radius of curvature rc with a radius of curvature threshold src predefined by the processor PR. It will be understood that when the radius of curvature rc is less than the radius of curvature threshold src (i.e. rc<src), the method step ends and the processor PR and the memory MD wait to receive the next radius of curvature rc.

If rc>src, in a sub-step 20, the processor PR and the memory MD decide to impose, on the first vehicle V1 (and more precisely, here (and for example), on the assistance device DA), a deceleration phase to reduce the speed of the first vehicle V1 down to a first deceleration speed (or of overtaking on a bend) vd1 which is adapted to the radius of curvature rc.

Then, in a sub-step 30, if the first vehicle V1 is overtaking a second vehicle V2 traveling in the second traffic lane VC2, the processor PR and the memory MD determine the current speed $v_{v2}$ of this second vehicle V2, and compares the first deceleration speed vd1 with this current speed $v_{v2}$.

As mentioned previously, the current speed $v_{v2}$ of the second vehicle V2 can be determined by the analysis circuits CAN from the environmental data determined by the sensor(s) on board the first vehicle V1 (and in particular by the sensor CP) and/or transmitted to the first vehicle V1 by a vehicle adjacent to the first vehicle V1, possibly the second vehicle V2, and/or by the road infrastructure, for example by means of car-to-car or vehicle-to-vehicle messages of the Car2X or V2X type.

It will be noted that if the first vehicle V1 is not engaged in an overtaking phase or if the first deceleration speed vd1 is greater than the current speed $v_{v2}$ (or vd1>$v_{v2}$), the processor PR and the memory MD impose the deceleration phase to the first deceleration speed vd1 on the first vehicle V1 in a sub-step 40. This imposition is done by generating instruction(s) or command(s). Then, once the first deceleration speed vd1 has been reached by the first vehicle V1, in a sub-step 50 the processor PR and the memory MD impose an acceleration phase on the first vehicle V1, for example until a speed equal to the speed setpoint cv is obtained (possibly adapted as a function of the speed of another vehicle located in front of the first vehicle V1). It is in fact considered that the bend no longer imposes a constraint on the speed of the first vehicle V1. It will be understood that here, it is the assistance device DA which controls the imposition of the acceleration phase on the first vehicle V1. This acceleration phase can be imposed just after the deceleration phase, or after allowing a predefined time to pass at the end of the deceleration phase, or even when the radius of curvature rc of the future portion which the first vehicle V1 is about to take becomes high enough not to require a new deceleration phase.

Conversely, if the first deceleration speed vd1 is lower than the current speed $v_{v2}$ (that is, vd1<$v_{v2}$), the processor PR and the memory MD determine a second deceleration speed vd2 which is greater than the determined current speed $v_{v2}$, in a sub-step 70. Then, the processor PR and the memory MD replace the first deceleration speed vd1 by the second deceleration speed vd2, and therefore impose the phase of deceleration down to this second speed of deceleration vd2 on the first vehicle V1 in a sub-step 80. This imposition is done by generating instruction(s) or command(s).

Thus, in the bend (apart from the exceptional situations mentioned below) the speed of the first vehicle V1 remains greater than that of the second vehicle V2 that it is overtaking, which makes it possible to avoid a slowdown in the flow of traffic and an attempt by a driver of a vehicle following the first vehicle V1 to overtake the first vehicle via the second traffic lane VC2 by following the second vehicle V2.

Once the second deceleration speed vd2 has been reached by the first vehicle V1, the processor PR and the memory MD perform the sub-step 50 in order to impose an acceleration phase (for example until obtaining a speed equal to the speed setpoint cv).

It will be noted that in step 10-80 of the method, the processor PR and the memory MD can determine, in a sub-step 60, a maximum deceleration speed $vd_{max}$ as a function of a first maximum transverse acceleration that the first vehicle V1 can undergo in the bend, taking into account the radius of curvature rc of the bend. In this case, the processor PR and the memory MD can determine a second deceleration speed vd2 which is less than or equal to this determined maximum deceleration speed $vd_{max}$ in sub-step 70. It should be noted that in certain exceptional situations, the determined maximum deceleration speed $vd_{max}$ may be less than or equal to the determined current speed $v_{v2}$, and therefore in these exceptional situations a second deceleration speed vd2 can be imposed which is less than or equal to the determined maximum deceleration speed $vd_{max}$ and therefore less than or equal to the determined current speed $v_{v2}$.

The first maximum transverse acceleration is, for example, determined by the assistance device DA. However, it could also be determined by the regulation device DR.

For example, in the sub-step 60, the processor PR and the memory MD can determine the maximum deceleration speed $vd_{max}$ as a function, moreover, of a second maximum transverse acceleration which takes into consideration a minimum passenger comfort level of the first vehicle V1. This second maximum transverse acceleration is a priori strictly less than the first maximum transverse acceleration (which the first vehicle V1 can withstand without risk).

Also for example, in sub-step 60, the processor PR and the memory MD can determine the maximum deceleration speed $vd_{max}$ as a function, moreover, of at least one parameter which can be chosen from the following: the speed setpoint cv (for the speed regulation of the first vehicle V1), the speed limit which is imposed on the first traffic lane VC1, the current speed and/or acceleration of the second vehicle V2, the number of vehicles preceding the second vehicle V2 in the second traffic lane VC2, the presence of another vehicle following the first vehicle V1 in the first traffic lane VC1, and the presence of another vehicle followed by the first vehicle V1 or by the second vehicle V2. These various parameters (of local context) can be determined by the analysis circuits CAN from the environmental data determined by the sensor(s) on board the first vehicle V1 (and in particular by the sensor CP), and/or can be transmitted to the first vehicle V1 by a vehicle neighboring the first vehicle V1 and/or by the road infrastructure, for example by means of messages of the Car2X or V2X type.

It will in fact be understood that the local context relating to traffic on the road R is important to take into consideration. Indeed, when overtaking, it is preferable for the first vehicle V1 to be placed in front of the second vehicle V2 as quickly as possible so as not to prevent other vehicles from doing the same and so as not to disturb the driver of the second vehicle V2. Likewise, the higher the traffic density, the more it is necessary to respect the current speed of the traffic flow (here in the first traffic lane VC1), in order to avoid accidents or generating slowdowns while respecting traffic regulations.

Also for example, in sub-step 70, the second deceleration speed vd2 can be determined by the processor PR and the memory MD as a function, in addition, of at least one parameter which can be chosen from the speed setpoint cv, the speed limit imposed on the first traffic lane VC1, the current speed and/or acceleration of the second vehicle V2, the number of vehicles preceding the second vehicle V2 in the second traffic lane VC2, the presence of another vehicle following the first vehicle V1 in the first traffic lane VC1, and the presence of another vehicle followed by the first vehicle V1 or by the second vehicle V2.

It will also be noted that in sub-step 80, the processor PR and the memory MD may not replace the first deceleration speed vd1 by the second deceleration speed vd2 when the first VC1 and second VC2 traffic lanes have different destinations. It is in fact considered that the first VC1 and second VC2 traffic lanes will soon no longer be adjacent and therefore that the first vehicle V1 is not in a phase of overtaking the second vehicle V2.

It will also be noted that the duration of the deceleration phase and the deceleration speed vd1 or vd2 are preferably determined so as to respect the longitudinal comfort.

Figure 3:
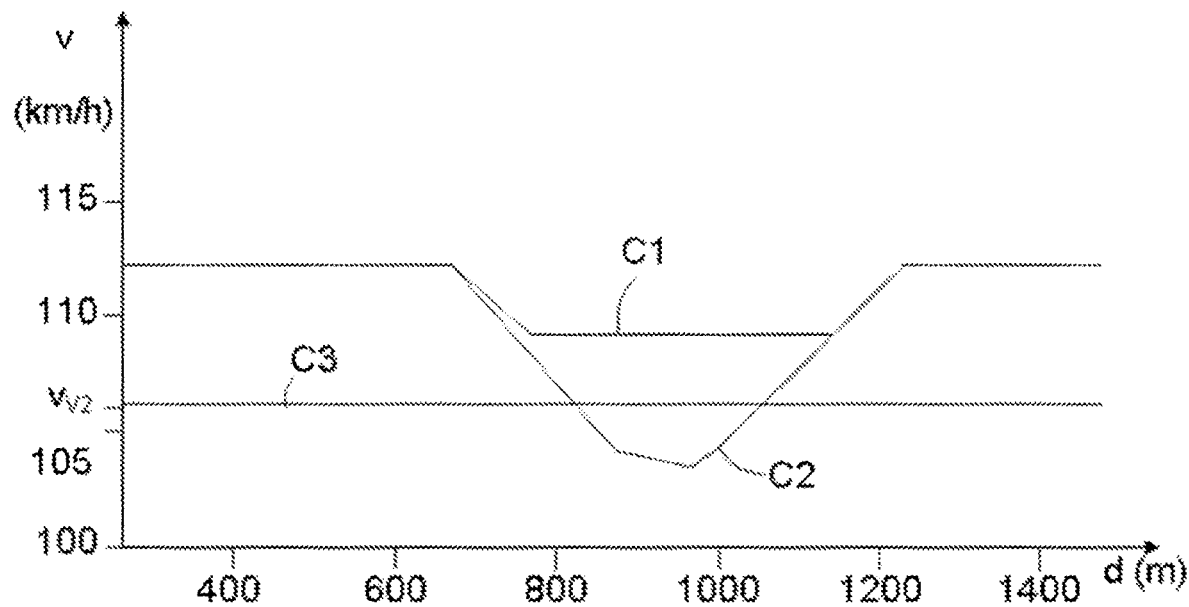
FIG. 3 illustrates schematically, within a diagram, first (C1), second (C2) and third (C3) curves for the evolution of the speed respectively of a first vehicle equipped with the new speed regulation device, of a first vehicle equipped with a speed control device of the prior art, and of a second vehicle being overtaken, as a function of the distance, and FIG. 4 schematically and functionally illustrates an embodiment of a speed regulation device.

FIG. 3 schematically illustrates in a diagram of first C1, second C2 and third C3 curves the evolution of the speed (in km/h) respectively of the first vehicle V1 (in curve C1), of another vehicle similar to the first vehicle V1 but equipped with a speed regulation device of the prior art (in curve C2), and of the second vehicle V2 during a phase of overtaking of the first vehicle V1 in a bend by the first vehicle V1 and by this other vehicle (in curve c3), depending on the distance.

It is considered here (curve C3) that the second vehicle V2 has a constant current speed $v_{v2}$ of approximately 107 km/h before, in, and after the bend. With a speed regulation device of the prior art (curve C2), on entering the bend, the other vehicle is subjected to a deceleration phase to a first deceleration speed vd1 equal to approximately 103 km/h, then an acceleration phase until it regains a speed equal to its speed setpoint cv (here equal to approximately 112 km/h). Consequently, this other vehicle finds itself in the bend with a minimum speed vd1 which is less than the constant speed $v_{v2}$ of the second vehicle V2, which can be penalizing for the traffic, or even potentially dangerous. Conversely (in curve C1), when entering the bend, the first vehicle V1 undergoes a deceleration phase to a second deceleration speed vd2 which is equal to approximately 109 km/h (and therefore greater than $v_{v2}$), then an acceleration phase until it regains a speed equal to its speed setpoint cv (here equal to approximately 112 km/h). Therefore, the first vehicle V1 continuously has a speed in the bend which is greater than the constant speed $v_{v2}$ of the second vehicle V2, and therefore does not risk penalizing traffic or potentially being dangerous.

It should be noted that a computer program product is proposed comprising a set of instructions which, when it is executed by processing means such as electronic circuits (or hardware), for example the computer CA, is capable of implementing the speed regulation method described above in order to regulate the speed of the first vehicle V1, in particular when it is preparing to travel through a bend.

Figure 4:
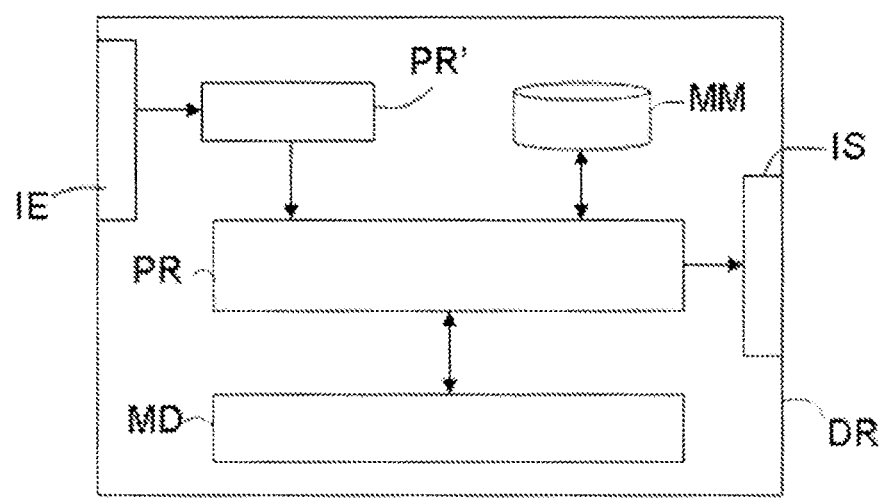

It will also be noted that in FIG. 4, the regulation device DR is very schematically illustrated with only its random access memory MD and its processor PR, which can comprise integrated (or printed) circuits, or else several integrated (or printed) circuits connected by wired or wireless connections. An integrated (or printed) circuit is understood to mean any type of device capable of performing at least one electrical or electronic operation. However, as illustrated non-limitingly in FIG. 4, the regulation device DR can also comprise a mass memory or storage MM, in particular for storing the acquired environmental data and any intermediate data involved in all its calculations and processing. Furthermore, this regulation device DR can also comprise an input interface IE for receiving at least the acquired environmental data, and possibly the position data of the first vehicle V1 (supplied by a navigation assistance device present in the first vehicle permanently or temporarily (when it is part of a portable device or a smartphone or a tablet accompanying a passenger)), in order to use the position data in calculations or processing, possibly after having shaped and/or demodulated and/or amplified them, in a manner known per se, by means of a digital signal processor PR'. In addition, this regulation device DR can also comprise an output interface IS, in particular for transmitting the first vd1 and second deceleration speeds that it determines.

One or more sub-steps of the speed regulation method step can be performed by different components. Thus, the speed regulation method can be implemented by a plurality of processors, random access memory, auxiliary storage, input interface, output interface and/or digital signal processor. In these situations, the regulation device DR can be decentralized, within a local network (a plurality of processors linked together for example) or a wide-area network.

The invention claimed is:

1. A method for regulating the speed of a first vehicle traveling in a first traffic lane of a road adjacent a second traffic lane, said first vehicle being an at least partially self-driving vehicle and knowing a radius of curvature of a curved portion of the first traffic lane that the first vehicle is approaching, said method comprising a step imposing a deceleration phase on said first vehicle down to a first deceleration speed if the first vehicle detects that the radius of curvature of said curved portion of said first traffic lane is representative of a bend, said first deceleration speed being determined as a function of said radius of curvature,
wherein, when said first vehicle is overtaking a second vehicle traveling along said second traffic lane, the method includes steps of:
determining a current speed of said second vehicle, then,
if said first deceleration speed is less than the determined current speed of said second vehicle, determining a second deceleration speed which is greater than said determined current speed of said second vehicle and replacing said first deceleration speed with said second deceleration speed such that the speed of the first vehicle is reduced to the second deceleration speed rather than the first deceleration speed, and such that said first vehicle can continue to overtake said second vehicle while traveling along said bend in said first lane.

2. The method according to claim 1, wherein a maximum deceleration speed is determined as a function of a first maximum transverse acceleration that said first vehicle can undergo on said bend taking into account said radius of curvature, and said second deceleration speed is determined which is less than or equal to said determined maximum deceleration speed.

3. The method according to claim 2, wherein, when said determined maximum deceleration speed is less than or equal to said current speed of the second vehicle, said second deceleration speed is imposed which is less than or equal to said determined maximum deceleration speed.

4. The method according to claim 2, wherein the maximum deceleration speed is further determined as a function of a second maximum transverse acceleration respecting a minimum level of passenger comfort of said first vehicle.

5. The method according to claim 2, wherein said maximum deceleration speed is further determined as a function of at least one parameter chosen from a speed setpoint for the speed regulation of said first vehicle, a speed limit imposed on said first traffic lane, the current speed and/or an acceleration of said second vehicle, a number of vehicles preceding said second vehicle in said second traffic lane, the presence of another vehicle following said first vehicle in said first traffic lane, and the presence of another vehicle followed by said first vehicle or by said second vehicle.

6. The method according to claim 1, wherein said second deceleration speed is further determined as a function of at least one parameter chosen from a speed setpoint for the speed regulation of said first vehicle, of a speed limit imposed on said first traffic lane, of a current speed and/or acceleration of said second vehicle, of a number of vehicles preceding said second vehicle along said second lane, of a presence of another vehicle following said first vehicle along said first lane, and of a presence of another vehicle followed by said first vehicle or by said second vehicle.

7. The method according to claim 1, wherein said replacement of said first deceleration speed by said second deceleration speed is not carried out when said first and second traffic lanes have different destinations.

8. A speed regulation device for regulating the speed of a first vehicle traveling in a first traffic lane of a road adjacent a second traffic lane, said first vehicle being an at least partially self-driving vehicle, the speed regulation device being adapted to determine a radius of curvature of a portion of the first traffic lane that the at least partially self-driving vehicle is approaching, said speed regulation device comprising at least one processor and at least one memory arranged to impose a deceleration phase on said first vehicle down to a first deceleration speed if said speed regulation device determines that said radius of curvature of said portion of said first traffic lane is representative of a bend, wherein, when said first vehicle is overtaking a second vehicle traveling along said second traffic lane, said processor and said memory are adapted to determine a current speed of said second vehicle, and then, if said first deceleration speed is less than the determined current speed of said second vehicle, determine a second deceleration speed greater than said determined current speed of said second vehicle, and replace said first deceleration speed by the second deceleration speed such that the speed of the first vehicle is reduced to the second deceleration speed rather than the first deceleration speed, and such that said first vehicle can continue to overtake said second vehicle while traveling along said bend in said lane.

9. A vehicle which is at least partially self-driving, wherein said vehicle comprises a speed regulation device according to claim 8.

* * * * *